Figure 1:
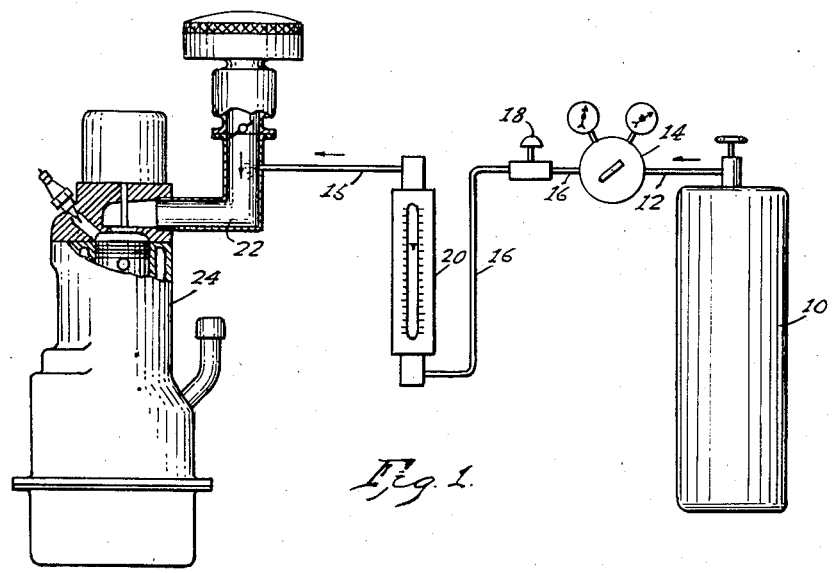

June 2, 1959  P. H. EMMETT ET AL  2,888,913
METHOD OF OPERATING AN INTERNAL COMBUSTION ENGINE
Filed Dec. 15, 1955

INVENTORS.
Paul H. Emmett,
Roderick S. Spindt and
Donald R. Stevens.
BY
ATTORNEY÷

United States Patent Office 2,888,913
Patented June 2, 1959

2,888,913

METHOD OF OPERATING AN INTERNAL COMBUSTION ENGINE

Paul H. Emmett, Baltimore, Md., and Roderick S. Spindt, Allison Park, and Donald R. Stevens, Wilkinsburg, Pa., assignors to Gulf Research & Development Company, Pittsburgh, Pa., a corporation of Delaware Application December 15, 1955, Serial No. 553,391

3 Claims. (Cl. 123—119)

This invention relates to a method of operating an internal combustion engine under conditions such that varnish deposition is minimized.

The deposition of gum, varnish and sludge on the interior surfaces of automotive, aviation and diesel engines and the accumulation of these deposits in the oil used to lubricate such engines deleteriously affects their operation and in many instances gives rise to engine failure. For many years the accumulation of sludge in the lubricating oil and the deposition of gum and varnish on engine parts was considered to be the result of using an inferior lubricating oil. While the lubricating oil may be a contributing factor in the formation of gum, varnish and sludge, it is not the sole factor. Other factors which contribute to engine deposits include engine design, engine operating conditions, engine maintenance and the type of fuel employed in the engine.

The automotive and petroleum industries have improved engine design, lubricating oil and fuel to such an extent that engine deposits resulting from these variables have been minimized. Other variables, including mode of operation and maintenance are not readily controlled to give optimum engine performance. Even if the operator of the engine uses extreme care in its operation and maintenance there are certain unavoidable service conditions which favor sludge and varnish formation. For example, engine deposits can be formed at high-temperature operation normally encountered when driving for an extended period of time at high speeds. On the other hand, engine deposits can be formed at low-temperature operation normally associated with intermittent use of the engine. Engine deposits formed as a result of intermittent operation of the engine at low temperatures are more prevalent because these are the conditions under which a high percentage of the automotive engines are being operated.

Sludge and varnish deposits are also encountered in stationary and marine engine installations. In some instances, stationary and marine engines are operated with a jacket water temperature below the minimum recommended temperature. The prevalence of over-cooling of such engines is probably due in part to the readily available supply of low temperature cooling water in such installations coupled with the belief of some operating engineers that elevated engine temperatures are undesirable or harmful to the engine. Conversely, the use of a jacket water temperature below the specified minimum temperature is frequently undesirable in that sludge deposits in the crankcase and lower engine sections and varnish deposits on the pistons are increased. In other instances, excessive sludge deposits in the crankcase and varnish deposition on the piston are a result of converting automotive engine to stationary service for which they were not specifically designed. In this regard, both gasoline and diesel engines have been extensively converted for powering irrigation pumps, electric generators, air compressors, and the like.

We do not wish to be limited to any theory concerning the formation of varnish at low temperatures. However, we believe that varnish formation at low temperatures is due primarily to the lubricating oil in the crankcase becoming diluted and contaminated with unburned fuel and with the reaction products of nitrogen oxides and fuel residues. Dilution and contamination of the lubricating oil with unburned fuel and nitrogen oxide reaction products may result from leakage of combustion chamber gases past the piston rings into the crankcase. These gases are commonly referred to as "blow-by" gases. Irrespective of the cause of varnish deposition, this invention is directed to a method of operating an internal combustion engine whereby varnish deposition is materially reduced.

We have found that the amount of engine varnish resulting from low-temperature operation can be substantially reduced if, during the normal operation of the engine at said low temperature, ammonia is introduced into the crankcase of the engine. For example, we have found that an engine operated under conditions normally tending to favor the deposition of varnish on the pistons of the engine, can be operated with substantial reduction in varnish deposition if the crankcase contains, in addition to the usual lubricating oil, a small amount of ammonia. This method of operation is particularly advantageous in stationary and marine engine installations.

The ammonia can be introduced directly into the crankcase of the engine and/or it can be introduced indirectly along with blow-by gases by adding ammonia through the air intake manifold. When the ammonia gas is added solely to the crankcase of the engine it is preferably added in an amount corresponding to about 0.1 to about 10 percent by volume based on the volume of blow-by gases. When ammonia is added through the manifold it is preferably added in an amount corresponding to about 0.01 to about 0.5 percent by volume based on the volume of intake air. When operating an engine with a thermally cracked gasoline and a highly refined paraffinic mineral lubricating oil, we have obtained good results by adding ammonia to the air intake manifold in an amount corresponding to about 0.1 percent based on the volume of air intake. The optimum amount of ammonia may vary depending upon the particular engine, the lubricating oil, the fuel on which the engine is operated, the operating conditions and the operator. In any event, the amount of ammonia used is sufficient to materially reduce the amount of varnish which would otherwise be formed under identical circumstances if ammonia were not present.

Figure 2:
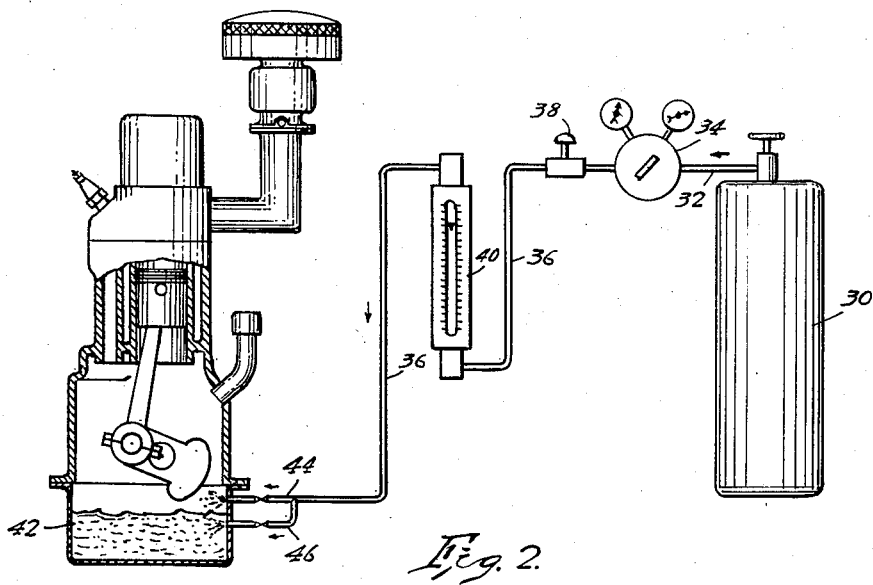

Figures 1 and 2 are schematic views, with parts broken away and in section, of apparatus for introducing ammonia into the air intake manifold and crankcase, respectively, of an internal combustion engine in accordance with preferred embodiments of the invention.

Now referring to Figure 1, liquid ammonia is stored in a high pressure cylinder or tank 10, which can be suitably located in a motor vehicle or near the engine in stationary and marine engine installations. Liquid ammonia passes from tank 10 through conduit 12 to a pressure regulator 14 where the pressure on the ammonia is reduced an amount sufficient to convert the liquid ammonia to gaseous ammonia. The gaseous ammonia thus formed passes through a flow control valve 18 and a flow indicator 20 in conduit 16. The gaseous ammonia is then introduced into air intake manifold 22 of internal combustion engine 24.

Referring now to Figure 2, liquid ammonia is stored in a high pressure cylinder or tank 30. Liquid ammonia passes from tank 30 through conduit 32 to a pressure regulator 34 where the pressure on the ammonia is reduced an amount sufficient to convert the liquid ammonia to gaseous ammonia. The gaseous ammonia thus formed passes through a flow control valve 38 and a flow indicator 40 in conduit 36. The gaseous ammonia is then introduced above and/or below the oil level in crankcase 42 by valved conduits 44 and/or 46, respectively.

The mineral lubricating oil in the crankcase can be any oil having a viscosity within the range of common lubricating oils. The oil can be either refined or semi-refined paraffinic, naphthenic or asphaltic base oil. If desired, a blend of oils of suitable viscosity can be employed instead of a single oil by means of which any desired viscosity can be secured.

The lubricating oil can contain minor amounts of conventional addition agents. Thus, for example, it is particularly advantageous in many instances to add an anti-foam agent to the lubricating composition. Other addition agents normally added to lubricating oils for a specific purpose such as an anti-oxidant, pour point depressant, corrosion inhibitor, viscosity index improver, oiliness and extreme pressure agent, and the like, can be employed without adversely affecting the improved anti-varnish characteristics derived by this invention.

The fuel employed in operating the engine can be either a straight-run gasoline or a cracked gasoline. A straight-run gasoline is usually cleaner burning than a cracked gasoline, and for this reason the amount of ammonia used when an engine is operated with a straight-run gasoline may be less than the amount used when a cracked gasoline is employed. In order to illustrate the improved results obtained in accordance with this invention a thermally cracked gasoline was employed.

Typical properties of a thermally cracked gasoline of the type used in making the tests reported herein are as follows:

Gravity, ° API _____ 60.0
Copper dish gum, mg./100 ml. _____ 21.0
Existent gum, mg./100 ml. (ASTM D 381) _____ 11.9
Oxidation stability, min. _____ 64
Bromine No. _____ 71.7
Olefins _____ 49.0
Aromatics _____ 1.5
Knock rating:
    Motor method, octane No. _____Clear__ 65.6
    Research method, octane No. _____do____ 74.2
Distillation, gasoline:
    Over point, ° F. _____ 94
    End point, ° F. _____ 387
    10% evaporation at, ° F. _____ 129
    50% evaporation at, ° F. _____ 247
    90% evaporation at, ° F. _____ 350

In order to illustrate the improved results obtained by introducing ammonia either into the crankcase or into the intake manifold tests were conducted in a two cylinder 90° V-type engine equipped with one 3½ inch Chevrolet power piston and one 3½ inch balance piston which had the crown surface removed and balance established with a ring insert. The power cylinder was fitted with overhead valves. The engine was run at a speed of 2500 r.p.m. with a load of 12.2 foot pounds for a period of 40 hours. The air-fuel ratio during the test period was 14 to 1 with a spark timing of 18° BTC. The crankcase was charged with 500 grams of oil. No oil was added during the test period. The oil temperature was maintained at 155° F. while the coolant temperature was 90° F. At the end of each test period the engine was disassembled. The deposits were removed and then divided into those soluble in acetone and those insoluble in acetone. The deposits removed from the power piston, dummy piston, dummy cylinder wall and dummy cylinder head were weighed, the deposit rating being specified as milligrams of deposit per square inch of surface.

The improved anti-varnish properties obtained when ammonia was introduced into the intake manifold or into the crankcase of an engine operated with a thermally cracked gasoline and lubricated with a paraffinic mineral oil are illustrated by the data set forth in the following table.

|  | Deposit Rating, mg./sq. in. | | |
| --- | --- | --- | --- |
|  | Reference Run | Ammonia[1] | Ammonia[2] |
| Deposits Soluble in Acetone: | | | |
| Power Piston | 1.9 | 0.6 | 0.5 |
| Dummy Piston | 7.6 | 0.7 | 0.6 |
| Dummy Cylinder Wall | 9.3 | 0.4 | 0.6 |
| Dummy Cylinder Head | 38.3 | 1.5 | 3.0 |
| Deposits Insoluble in Acetone: | | | |
| Power Piston | 0.3 | 0.2 | 0.1 |
| Dummy Piston | 1.6 | 0.1 | 0.1 |
| Dummy Cylinder Wall | 0.5 | 0.3 | 0.1 |
| Dummy Cylinder Head | 12.5 | 0.6 | 1.9 |

[1] 1 cu. ft./hr. (0.1% by volume) ammonia added to intake manifold.
[2] 1.5 cu. ft./hr. (approximately 10% based on volume of blow-by gas) ammonia passed through oil in the crankcase.

The above data show that the addition of ammonia either to the intake manifold or to the crankcase materially reduces the amount of deposits normally formed in the operation of the engine.

While our invention has been described with reference to various specific examples and embodiments it will be understood that the invention is not limited to such examples and embodiments and may be variously practiced within the scope of the claims hereinafter made.

We claim:
1. A method of operating an internal combustion engine with a hydrocarbon fuel and a mineral oil crankcase lubricant under operating conditions normally tending to favor the deposition of varnish within said engine which comprises introducing a small amount, sufficient to substantially reduce such varnish deposition, of ammonia into the crankcase of said engine without otherwise changing the operating conditions of said engine.

2. A method of operating an internal combustion engine with a hydrocarbon fuel and a mineral oil crankcase lubricant under operating conditions normally tending to favor the deposition of varnish within said engine which comprises introducing ammonia directly into the crankcase of said engine in an amount corresponding to about 0.1 to about 10 percent by volume based on the volume of blow-by gas, such varnish deposition being thereby substantially reduced.

3. A method of operating an internal combustion engine with a hydrocarbon fuel and a mineral oil crankcase lubricant under operating conditions normally tending to favor the deposition of varnish within said engine which comprises introducing ammonia indirectly into the crankcase of said engine by introducing the ammonia into the air intake manifold of said engine in an amount corresponding to about 0.01 to about 0.5 percent by volume based on the volume of intake air, the ammonia passing to said crankcase together with engine blow-by gases and thereby substantially reducing the deposition of varnish.

References Cited in the file of this patent

UNITED STATES PATENTS

| 1,669,181 | Walter | May 8, 1928 |
| --- | --- | --- |
| 1,878,401 | John | Sept. 20, 1932 |
| 1,883,593 | Cross | Oct. 18, 1932 |
| 1,919,825 | Burk | July 25, 1933 |
| 1,973,474 | Egloff et al. | Sept. 11, 1934 |
| 2,149,033 | Schulze | Feb. 28, 1939 |

FOREIGN PATENTS

| 364,533 | Great Britain | Dec. 28, 1931 |
| --- | --- | --- |
| 44,251 | Netherlands | Oct. 15, 1938 |